June 14, 1966   G. A. COOLEY ETAL   3,255,474
NAIL HEADING MECHANISM
Filed Dec. 6, 1963   8 Sheets-Sheet 1
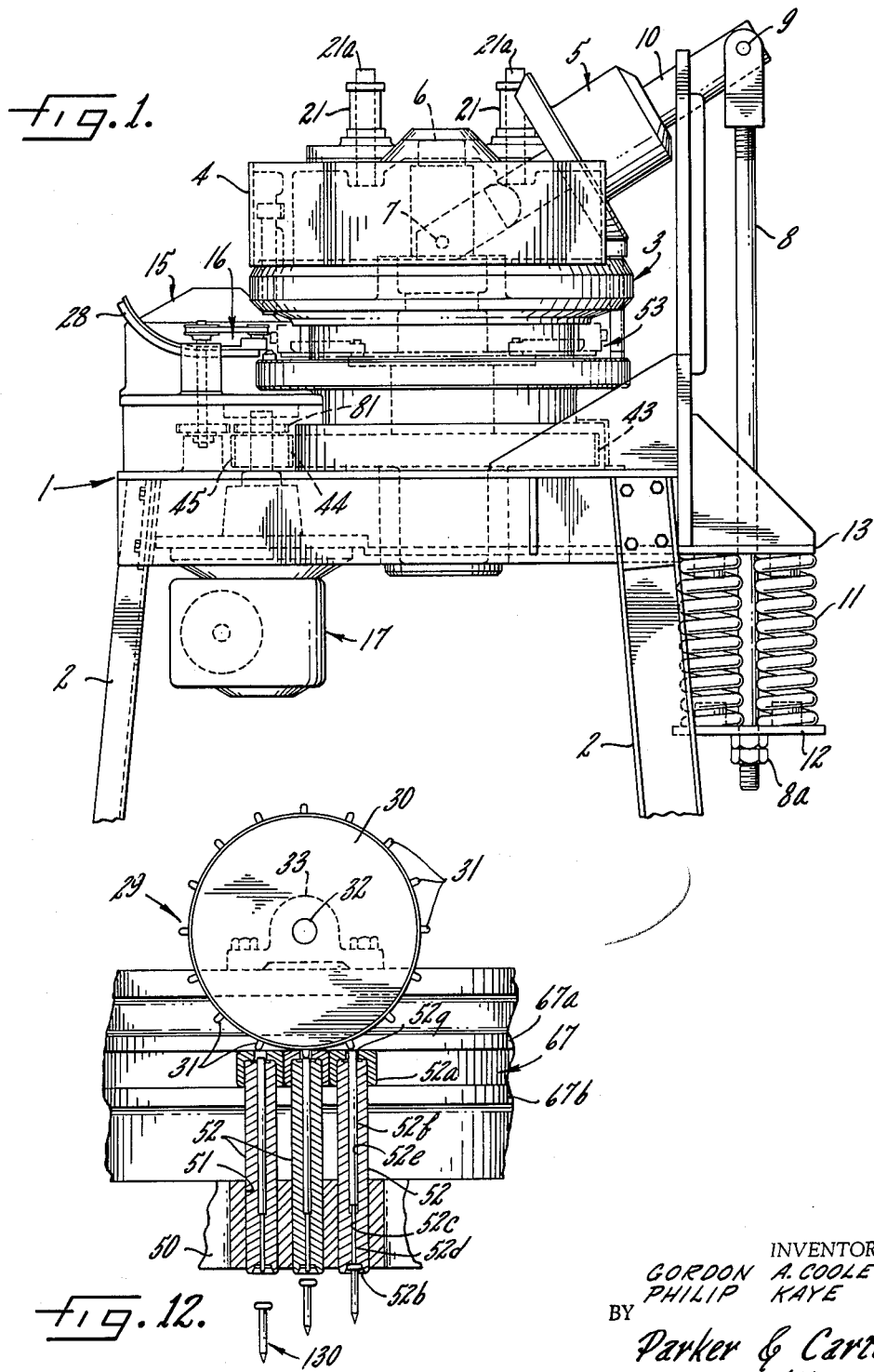
INVENTORS.
GORDON A. COOLEY
PHILIP KAYE
BY
*Parker & Carter*
*Attorneys.*

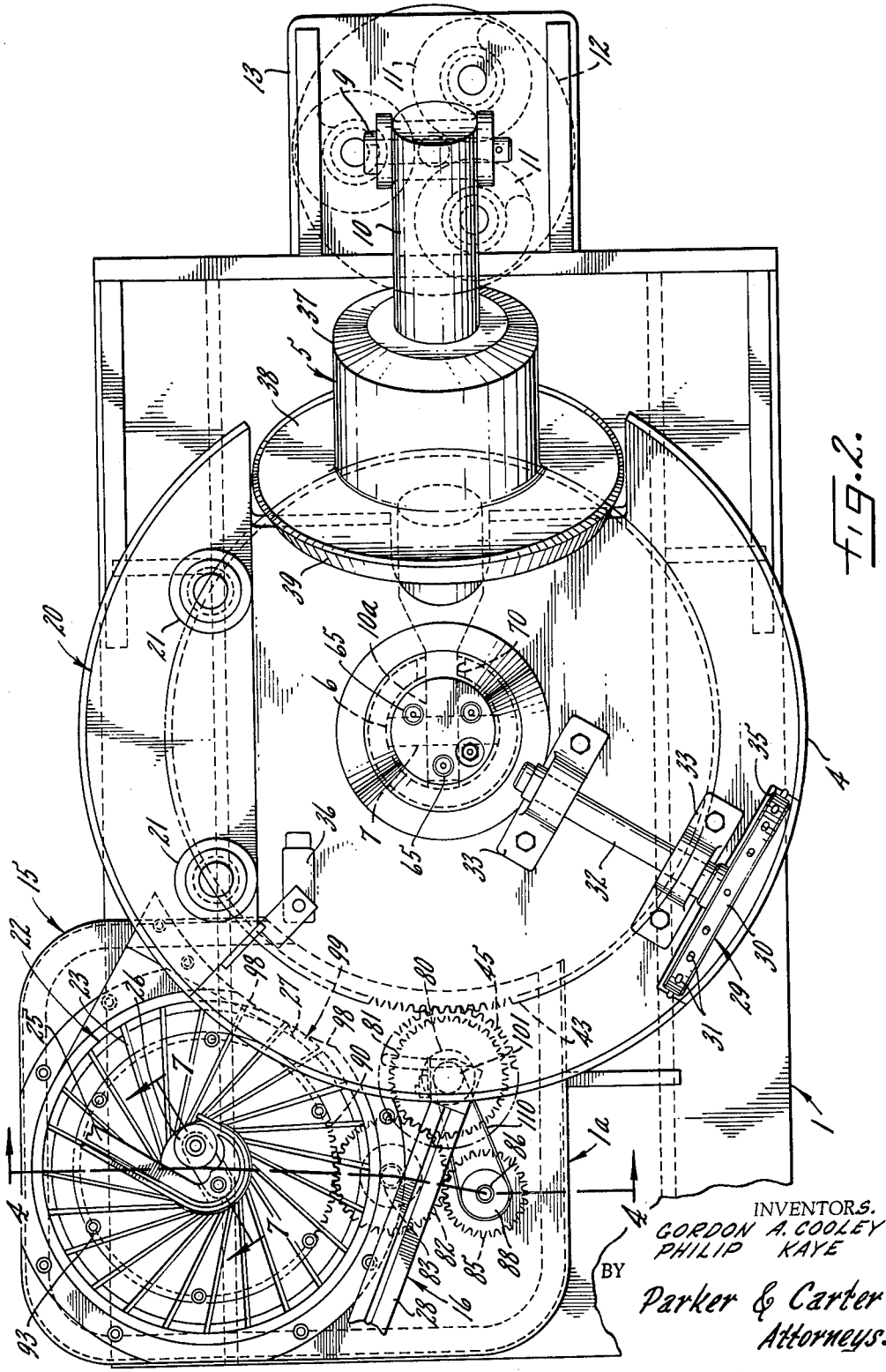

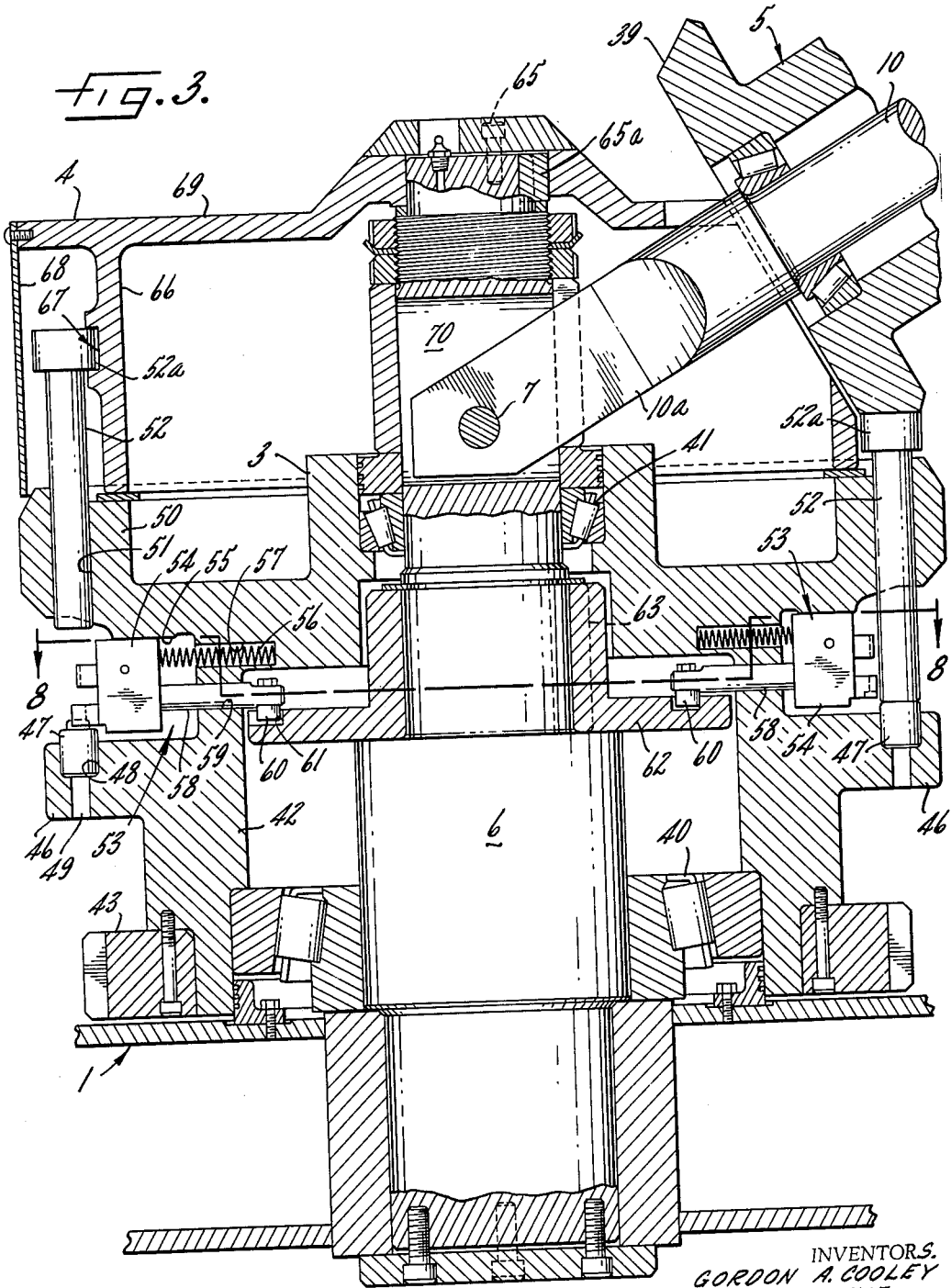

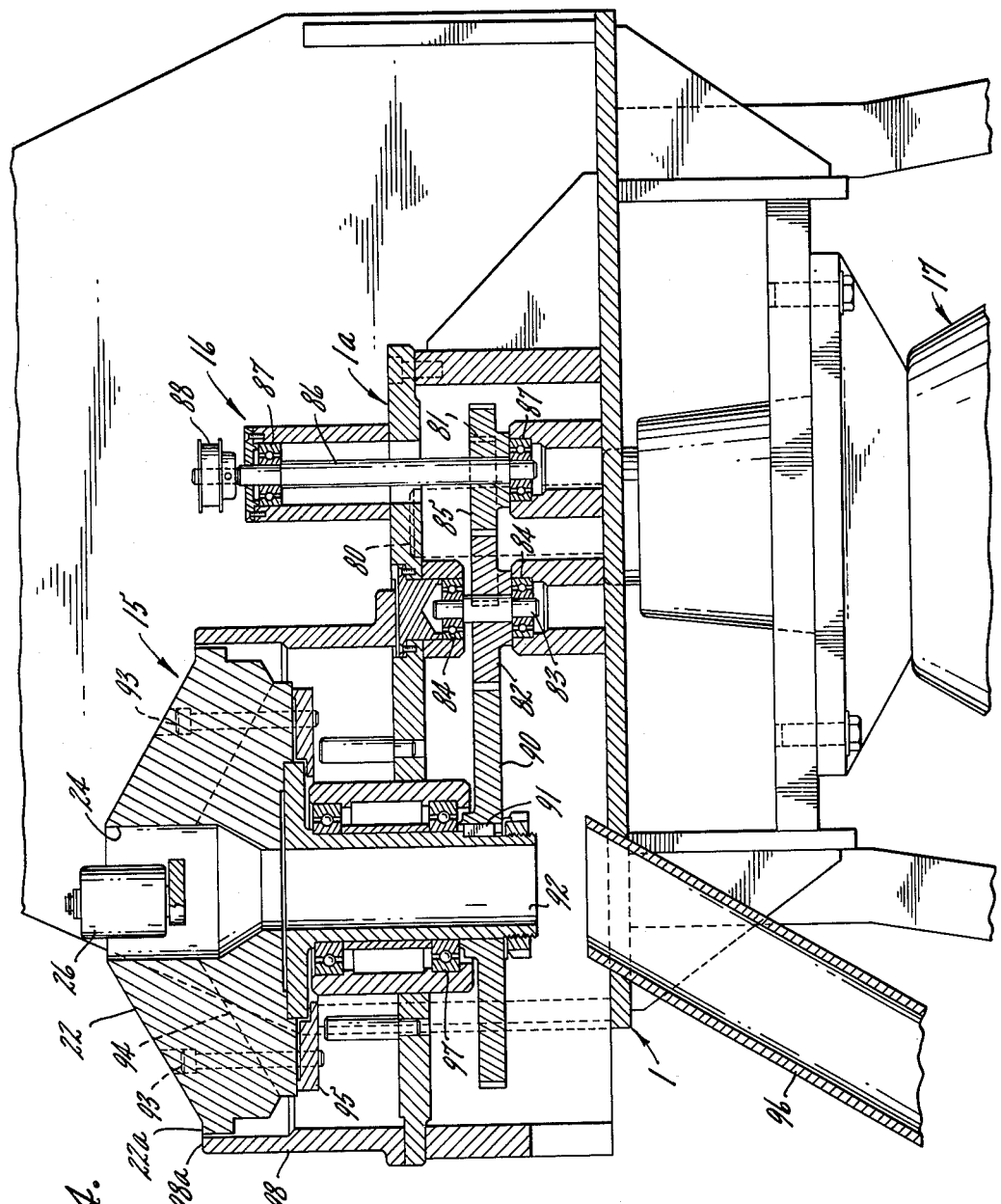

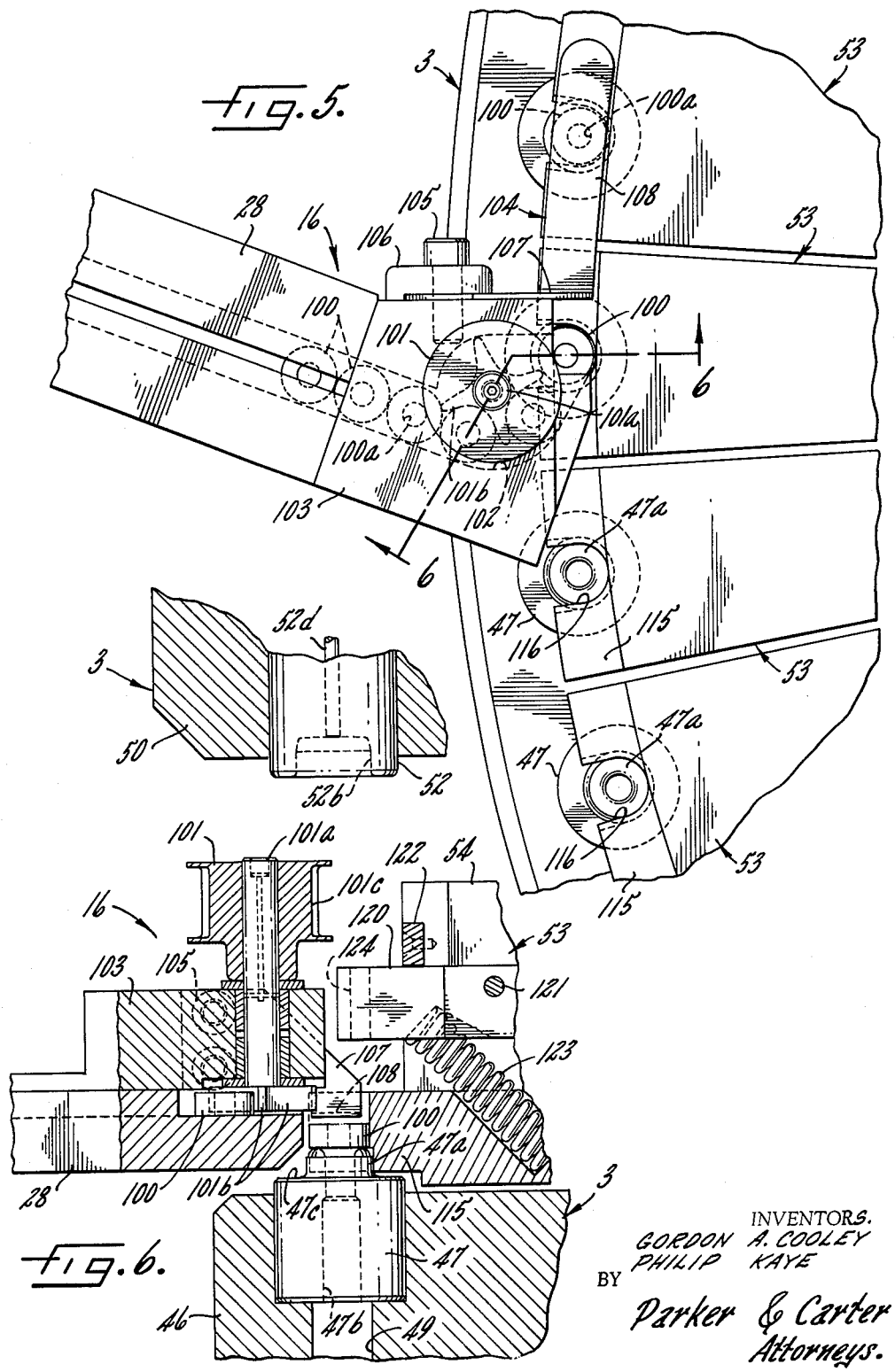

INVENTORS.
GORDON A. COOLEY
PHILIP KAYE
BY Parker & Carter
Attorneys.

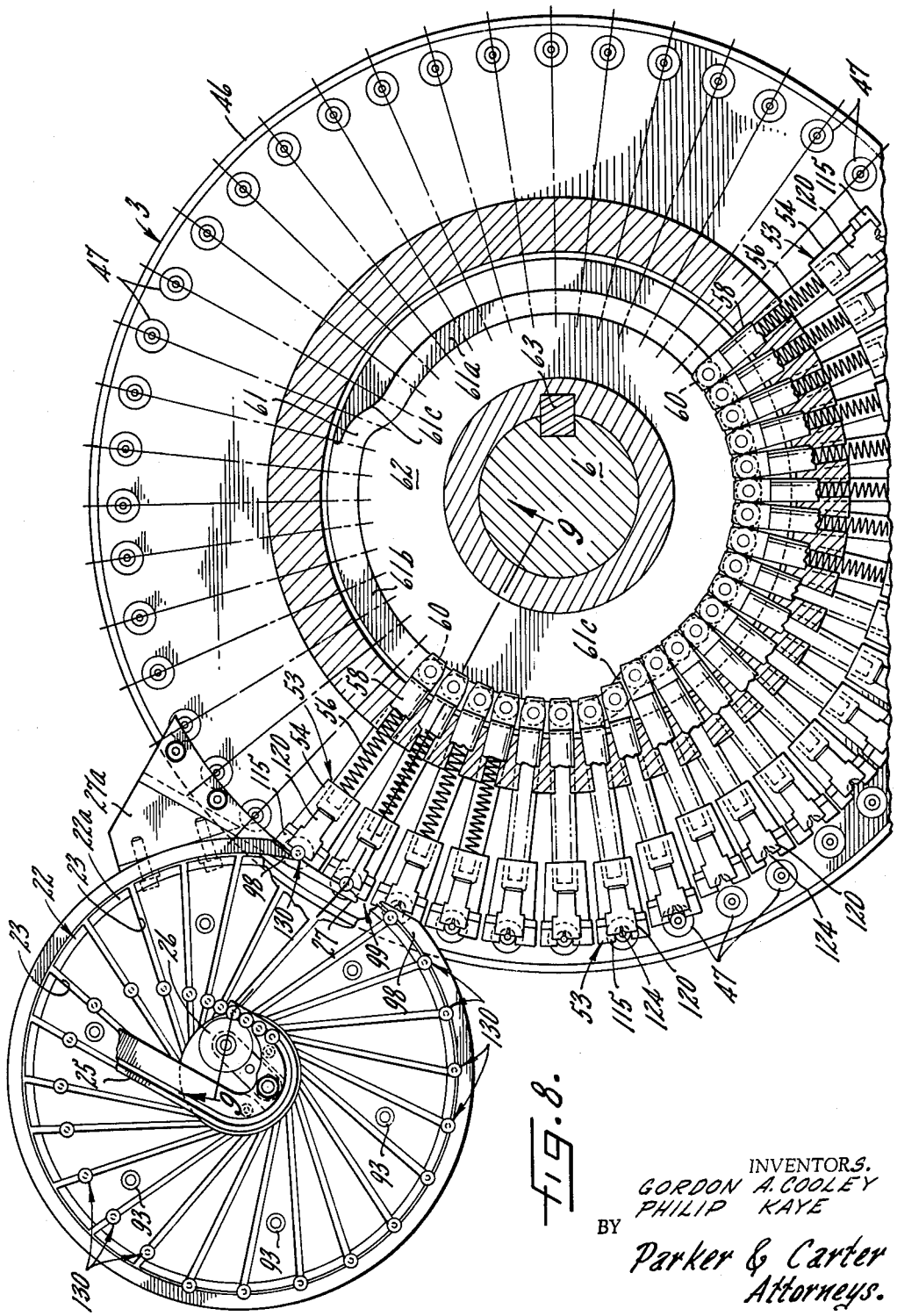

INVENTORS.
GORDON A. COOLEY
PHILIP KAYE
BY
Parker & Carter
Attorneys.

3,255,474
NAIL HEADING MECHANISM
Gordon A. Cooley, Chicago, and Philip Kaye, Wilmette, Ill., assignors to The Deniston Company, Chicago, Ill., a corporation of Illinois
Filed Dec. 6, 1963, Ser. No. 328,549
8 Claims. (Cl. 10—158)

This invention relates to a means and method of forming a product known as a "lead-headed nail."

Presently known machinery and methods for permanently securing lead caps or washers on the heads and shanks of wire nails involve the hammering of the nail and washer in suitably formed dies. The production rate of such prior machinery and methods is unsatisfactorily low and the constant hammering is productive of injury to and consequent down time of the machinery. Prior machines and methods are also subject to and productive of disturbing noise and vibration. The constant pounding or hammering employed in the present impact machines and methods is further destructive of the floor for such machinery. Accordingly it is one purpose of the invention to provide a means and method for permanently securing lead caps or washers on the heads and shanks of wire nails which shall achieve a much more rapid rate of production and which shall avoid all of the other unsatisfactory features of prior means and methods.

Another purpose of the invention is to provide a means and method of making lead-headed nails which shall produce such products at a minimum rate of one thousand per minute.

Another purpose is to provide a means and method of forming lead-headed nails wherein a nail and head are secured smoothly and without hammer or impact.

Another purpose is to provide a unitary machine assembly having elements effective rapidly to mate a lead washer and a nail and to secure the same together.

Another purpose is to provide a machine assembly incorporating a washer-feeding mechanism, a nail-feeding mechanism and a mechanism for securing the washer and nail together.

Another purpose is to provide a unitary machine assembly having washer-feeding, nail-feeding and product-forming means driven by a single power source.

Another purpose is to provide a means and method of forming lead-headed nails which shall employ a smooth application of pressure to the nail and a washer or head.

Another purpose is to provide a means and method of forming lead-headed nails which shall employ an adjustably smooth application of pressure to the nail and the lead head to secure the same together.

Another purpose is to provide a means and method of forming lead-headed nails which shall be positive in operation.

Another purpose is to provide a means and method of forming lead-headed nails which shall include automatic means for stopping the operation thereof in the event of the ingestion of an improper nail or washer.

Another purpose is to provide a means and method of forming lead-headed nails which shall be devoid of hammering impact action.

Another purpose is to provide a means and method of forming lead-headed nails which shall employ a minimum number of moving parts.

Other purposes will appear from time to time during the course of the specification and claims.

The invention is illustrated more or less diagrammatically in the accompanying drawings, wherein:

FIGURE 1 is a side elevation;
FIGURE 2 is a top plan view;
FIGURE 3 is a detailed view in partial cross section illustrating the major elements in the product-forming assembly;

FIGURE 4 is a view taken on the line 4—4 of FIGURE 2 and illustrating a detail portion of the washer and nail-feeding assemblies;

FIGURE 5 is a detailed top view illustrating a portion of the washer-feeding assembly;

FIGURE 6 is a view taken on the line 6—6 of FIGURE 5 and illustrating portions of the washer-feeding and nail-washer-receiving assemblies;

FIGURE 8 is a view taken on the line 8—8 of FIGURE 3 and illustrating the nail-feeding and nail-washer-receiving assemblies;

FIGURE 12 is an end view of the product-discharge assembly in partial cross section.

Like parts are indicated by like numerals throughout the specification and drawings.

Figure 9:
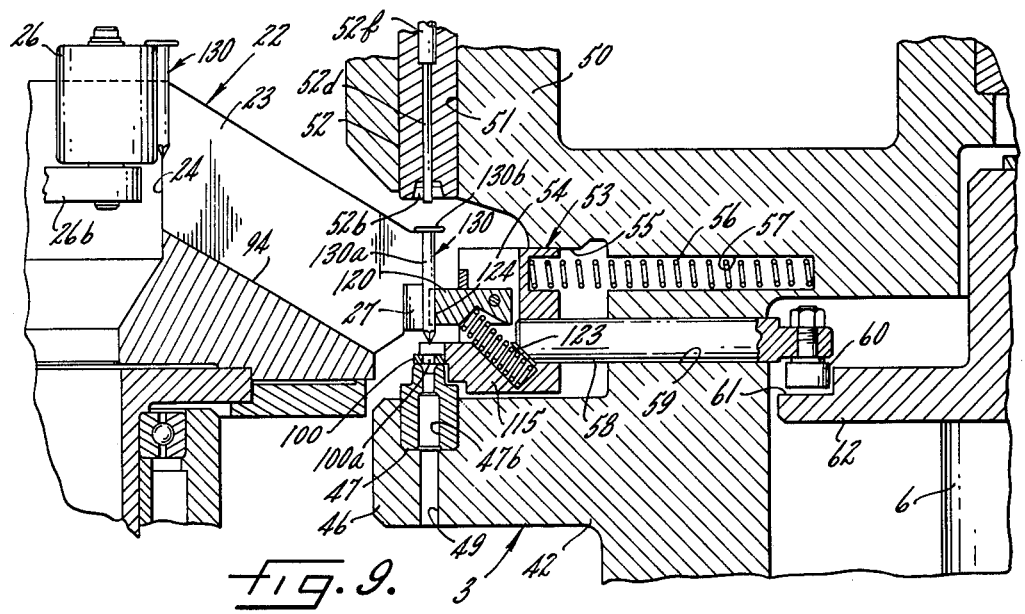
FIGURE 9 is a view taken on the line 9—9 of FIGURE 8 and illustrating portions of the nail-feeding and product-forming assemblies.

Referring now to the drawings, and particularly to FIGURE 1, the numeral 1 designates generally a base or support. The base 1 may be conveniently supported in any suitable manner, such as by the legs 2. Rotatably supported on the base 1 is a product-forming turntable assembly 3. A fixed cam housing 4 is positioned above the assembly 3. A pressure roller 5 is pivotally supported, as indicated in dotted lines, on the fixed shaft 6 as indicated at 7. Pressure is adjustably supplied to the roller 5 through a rod 8 pivotally secured as at 9 to the roller shaft 10 and urged toward the assembly 3 by a plurality of springs 11 working against a plate 12 secured to shaft 8 and against a plate 13 secured to base 1. A nail-feeding turntable or carousel 15 is rotatably mounted on the base 1 adjacent the turret 3. A washer-feeding assembly 16 is also carried by the base 1 adjacent the turret 3. Suitable power means, for example the motor 17, is shown as carried by the base 1 and as having a driving connection, described hereinbelow, with the turret 3 and assemblies 15, 16.

Referring now to FIGURE 2, the numeral 20 designates generally a separate portion of the pressure rod cam assembly and housing which is urged downwardly by its own weight under the influence of gravity, there being linear low friction bearings contained in upstanding housings 21 and liner pins 21a effective to maintain alignment between cam 20 and housing 4.

The nail-feeding assembly 15 includes the carousel or turntable member 22, the upper surface of which is generally frusto-conical and which carries a plurality of grooves 23 arranged in regular relationship to the radii of turntable member 22. While each of the grooves 23 is straight, each is positioned on the member 22 to extend from the periphery thereof to the hollow core 24 of the member 15 in a path offset from the radial. A nail chute or track 25 is positioned to deliver nails to the core 24 and to present said nails sequentially to a roller 26 in rotating contact with the inner surface of the core 24. Shown in dotted lines in FIGURE 2 is a nail ejector finger 27 fixedly mounted beneath the member 22.

A washer delivery chute or track 28 is shown in FIGURE 2 and is positioned for delivery of washers to the turret assembly 3.

A product-ejector assembly 29 is shown in FIGURE 2 as including the wheel 30 having a plurality of circumferentially spaced, outwardly radially extending fingers 31. The wheel 30 is carried by shaft 32 which is rotatably mounted in bosses 33. The bosses 33 are spacedly mounted upon the upper surface of housing 4 and locate the shaft 32 in a radial plane with respect to the axis of rotation of turret 3. The housing 4 is cut away, as indicated at 35, to provide for the wheel 30.

A limit or cutoff switch assembly 36 is associated with the housing 4 and safety cam portion 20, as will appear further hereinbelow.

The pressure roller 5 includes a cylindrical portion 37 freely rotatable on shaft 10 and a flange portion 38 carried by the portion 37 and having a chamfered, peripheral, pressure rod-contact surface 39.

For clarity and convenience herein, it will suffice to describe certain assemblies and elements in the singular, it being understood that a plurality of such assemblies and elements are present.

Referring now to FIGURE 3, the fixed shaft 6 carries the turntable or turret assembly on bearing elements shown generally at 40, 41. The assembly 3 includes a central, hollow, cylindrical portion 42. The portion 42 carries at one end a gear member 43. As may be best seen in dotted lines, and as indicated at 44 in FIGURE 1, the gear 43 meshes with a gear 45 driven by the power means 17 to rotate the turret 3. An annular flange 46 is positioned intermediate the ends of turret 3 and carries a plurality of fixed die members 47. The die members 47 are carried in a counterbore 48 which in turn communicates with a bore 49 extending through the flange 46.

A second annular flange portion 50 is carried by the turret 3 adjacent its end opposite the gear 43. A plurality of circumferentially spaced transverse passages or bores 51 are formed in the flange 50 and slidably receive a pressure rod member 52. Between the flanges 50, 46 the turret 3 is formed and adapted to carry a plurality of nail-and-washer-positioning assemblies indicated generally by the numeral 53.

The assembly 53 includes a block 54, the upper surface of which is slidable against a lower surface 55 on flange 50. The block 54 is urged outwardly by a cam and track assembly, below described, and by the spring 56 carried in a radially extending pocket 57 formed in the central cylindrical portion 42 of turret 3. Block 54 is carried by a shaft or rod 58 slidably positioned in a radially extending passage 59 in turret portion 42. The inner end of rod 58 rotatably carries a cam roller 60 which rides in a fixed cam track 61 formed in the annularly extending surface of a cam track member 62 fixed on the shaft 6. The member 62 is fixed in the shaft 6 as by a key 63 shown in dotted lines in FIGURE 3 and in cross section in FIGURE 8. While the cam track 61 directs reciprocation of block 54 the spring 56 flexibly maintains block 54 in its outermost position against a die nose 47a.

The cam housing 4 is secured to an upper portion of shaft 6 in any suitable manner, as by a fastener such as that shown at 65 and may be located in relation to other components by a key 65a. The housing 4 has a laterally extending circumferential wall portion 66, the outer surface of which is formed to create the push rod cam track shown generally at 67 and described further hereinbelow. A circumferential skirt 68 is secured to an outer peripheral portion of the upper wall 69 of housing 4 and extends toward turret 3 in overlying relationship with the track 67 and with the upper edge of turret 3.

The upper portion of shaft 6 is laterally slotted as indicated in dotted lines at 70 in FIGURE 2 and as shown in FIGURE 3 in partial cross section. The shaft 10 includes a flattened end portion 10a through which a pivot pin extends, as indicated at 7.

Each pressure rod member 52 carries adjacent one of its ends an enlargement or head 52a which in turn rides in fixed cam track 67. As may be best seen in FIGURE 12, the heads 52a may be in contact about the periphery of cam 67, the passages 51 in turret flange 50 being positioned to provide for the maximum number of rod members 52 about the periphery of turret 3.

Referring now to FIGURE 4, the numeral 80 indicates a power shaft. The gear 81 on shaft 80 meshes with a gear 82 carried on a shaft 83. The shaft 83 is in turn mounted in bearings 84 carried by the base 1 and by a sub-base 1a positioned about the base 1. The gear 85 is secured to a shaft 86, which is in turn carried by bearings 87. The shaft 86 carries at one of its ends a pulley 88, the purpose of which will be described hereinbelow.

The gear 82 is also in mesh with a gear 90. The engagement of gears 82, 85 and 90 may be seen partially in dotted lines in FIGURE 2. The gear 90 is secured, as by the key 91, to a hollow shaft 92. The shaft 92 carries the nail-feeding turntable 22 and is secured thereto by suitable means such as the fasteners 93. The tracks 23 are formed in a single turntable member 22. It will be understood, however, that the tracks 23 may be formed by spacing a plurality of individual segments forming the member 22 and, in that event, each such segment would be individually secured to a base member. As shown in dotted lines in FIGURE 4, as at 94, the bottom wall of tracks 23 parallels the inclined upper surface of the member 22 and the fasteners 93 extend downwardly for engagement with the base plate 95. The plate 95 is a segmental clamp plate facilitating adjustment of member 22 to provide a nail transfer which may either lead or lag the station in turret 3. The hollow core 24 in member 22 communicates with the area within hollow shaft 92, which in turn is positioned above a discharge chute 96 for delivery of any discarded nails outwardly of the assembly. The hollow shaft 92 is rotatably supported by suitable bearing means, such as that shown generally at 97, the said bearing assembly being supported on subframe plate 1a. Member 22 is substantially surrounded by a circumferential wall 98, the upper surface of which is positioned for sliding support of a nail head as member 22 rotates, the level, flat, outer, peripheral surface 22a serving also to support the nail head. As may be best seen in dotted lines in FIGURE 2, as at 99, the wall 98 is interrupted at the point of discharge of the nails from the tracks 23, the finger 27 being positioned adjacent the area of said interruption.

Referring now to FIGURE 5, the washer-delivery track 28 is positioned to deliver individual washers, such as those shown in dotted lines in FIGURE 5 at 100, to a turnstile or paddle member, also shown in dotted lines in FIGURE 5 at 101. The track member 28 has a pair of spaced parallel walls, the outer wall of which curves about the periphery of member 101 as indicated at 102, whereby washer 100 is engaged by a pair of adjacent paddle elements on the member 101 and is urged along the wall 102 which in turn is directed tangentially from the member 101 to deliver washers to the turret 3, as will be further described hereinbelow. The member 101 is rotatably carried in a block 103, to the outer surface of which is secured a washer-positioning finger member 104. Any suitable means may be employed to secure the member 104, the fastener 105 and clamp element 106 being illustrated. The member 104 consists of a base plate 107 arranged for securing to the outer surface of block 103 and a curved spring finger element 108 overlying the periphery of turret 3 and overlying the washer-receiving portion of assembly 53 described hereinbelow. A skirt (not shown) may be carried by finger 104 to close the open side of such washer receiver and such skirt could extend a distance sufficient to preclude washer escape prior to the nail insertion described below.

Referring now to FIGURE 6, it will be observed that the washer turnstile member 101 includes a shaft 101a rotatably supported by the block 103 and carrying at one of its ends the paddle elements 101b in alignment with the washer track 28. The opposite end of the shaft 101a is secured to a pulley 101c. As may be best seen in FIGURE 2, pulley 101c is driven by a continuous belt 110 which is in turn driven by the sprocket 88, the latter appearing in greater detail in FIGURE 4.

As appears in FIGURES 5, 6 and 9, the block 54 of the assemblies 53 includes a washer-receiving radially extending flange segment 115. The segment 115 carries a centrally positioned nest for the washers 100. The nests 116 are generally U-shaped and outwardly open and are positioned over the die 47 when the parts are shown in the position illustrated in FIGURES 5, 6 and 9.

The die 47 has a circumferential upwardly extending die portion 47a having a rounded upper surface and an axial bore 47b which communicates with the bore 49 in flange 46 of turret 3.

The block 54 also carries a nail-receiving magnet member 120 which is pivoted to block 54, as indicated at 121, and which is urged upwardly against a stop 122 by an inclined spring 123. The member 120 has a nail-receiving outwardly open slot 124 formed in its outer end surface, that slot 124 being formed and adapted to receive the shank of a nail 130 as illustrated, for example, in FIGURES 8 and 9.

Referring now to FIGURES 6, 9 and 12, it will be observed that the end surface of pressure rod 52 opposite that carrying head 52a has a die formation or well 52b formed therein. The rod 52 also has an axial bore 52c in which rides a knockout pin 52d, the bore 52c having an enlarged portion or counterbore 52e in which an enlarged portion 52f of knockout pin 52d rides. It will be observed that the pin 52d, 52f is of sufficient lineal extension so that it may extend either through an aperture 52g in cap 52a for engagement by fingers 31 or into well 52b for engagement with a nail when the latter is positioned therein.

Figure 7:
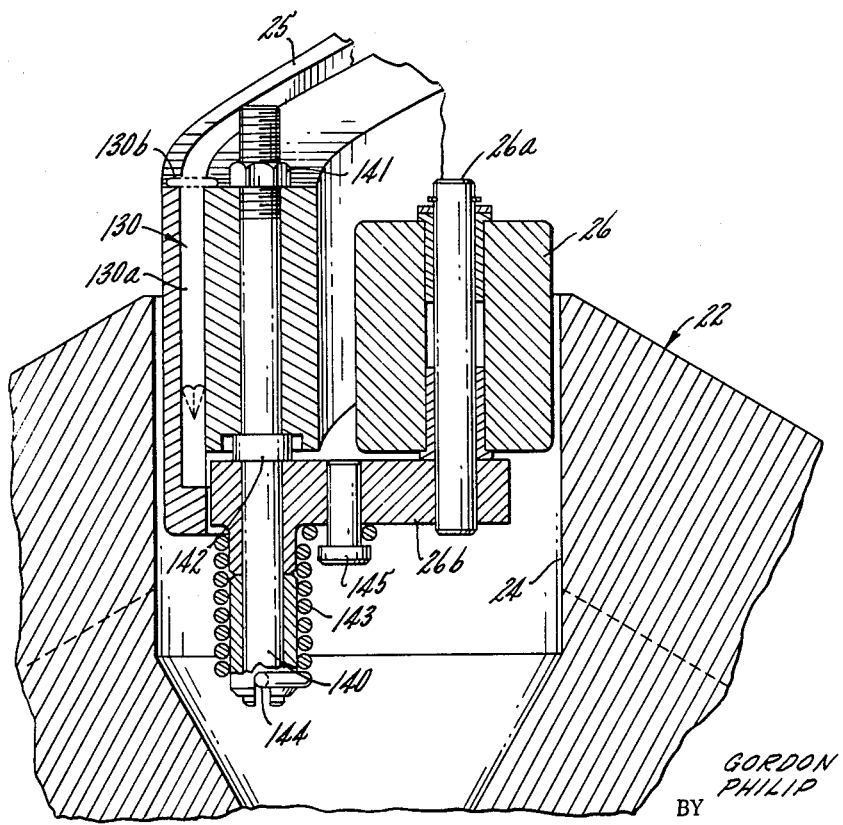
FIGURE 7 is a view taken on the line 7—7 of FIGURE 2 and illustrating a portion of the nail-feeding assembly.

Referring now to FIGURES 2, 7 and 9, the nail-delivery track member 25 is formed of a parallel set of elongated side walls spaced apart a distance only slightly greater than the width of the nail shank 130a of nail 130 and less than the diameter of the head 130b of nail 130 whereby said head may support the nail in the track and the nail may drop by gravity through the inclined portion of track 25. The nails drop through a substantially elongated straight and downwardly inclined portion of track 25 and then through a curved end portion shown best in FIGURE 2, the beginning of which appears in FIGURE 7. The end portion also is continuously downwardly inclined. The nails are delivered by the track 25 to the narrow space between roller member 26 and the inner circumferential surface of hollow core 24 and member 22. The roller 26 is rotatably supported on a shaft 26a which is in turn supported on a base or arm 26b. The arm 26b is rotatably supported on a fixed shaft 140 secured to a part of the curved inner track element of track 25, the shaft 140 being secured, for example, by nut 141 and bearing sleeve 142. A spring 143 has its opposite ends secured to shaft 140 as indicated at 144 and to an ear or abutment member 145 on arm 26b whereby the roller 26 may be yieldingly urged into engagement with the inner surface of core 24.

Referring now to FIGURE 8, the cam track 61 is shown in greater detail. The track 61 has a first and major circumferential portion 61a and an outwardly disposed circumferential portion 61b, the two being joined by gently curved portions 61c whereby the block 54 and its associated elements may be urged outwardly as each approaches the washer and nail-delivery means 16, 15 and whereby the assemblies 53 may be maintained in said outwardly extended position, over the dies 47, while the washers and nails are mated, the assemblies 53 being retracted as the turret 3 rotates in clockwise direction, as the parts are shown in FIGURE 8, to provide for the permanent securing of the washers 100 to the nails 130, as will be more fully described hereinbelow. An attachment plate 27a is shown clearly in FIGURE 8 and carries the deflecting finger member 27, the nail-deflecting end portion of which appears in FIGURE 9.

Figure 10:
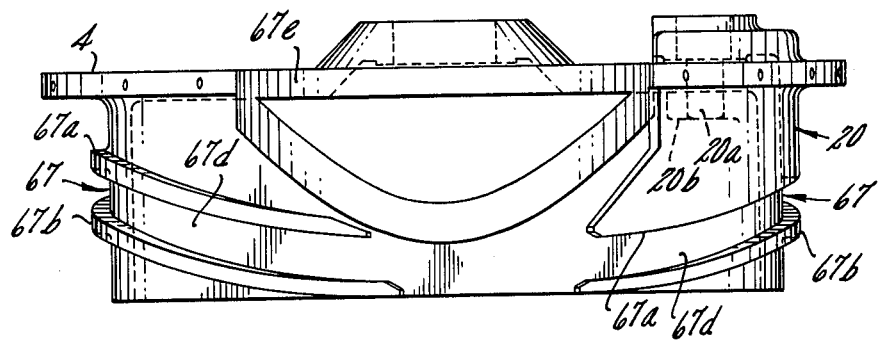
FIGURE 10 is a side elevation illustrating the press rod cam element of the product-forming assembly.
Figure 11:
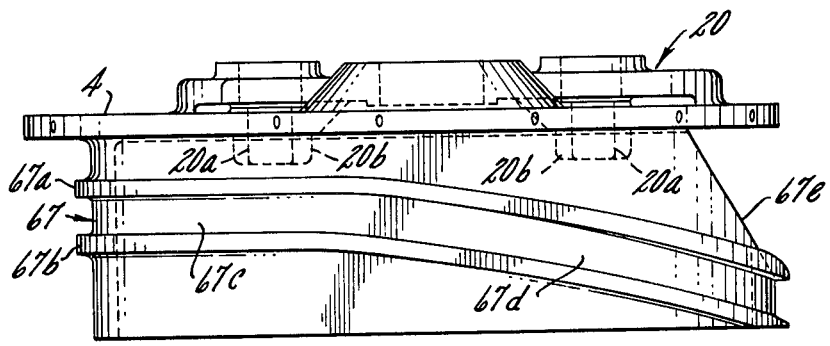
FIGURE 11 is a view of the press rod cam assembly taken at 90 degrees to the view of FIGURE 10.

FIGURES 10 and 11 illustrate the fixed cam member for the pressure rods 52. It will be observed that the cam track 67 comprises a pair of spaced parallel track elements 67a, 67b and that the track 67 includes a generally horizontal circumferential portion 67c and a downwardly curved portion 67d. The curved portion 67d is broken at its lowermost point as is clearly seen in FIGURE 10 and the cam housing is cut away, as indicated at 67e to provide for interpenetration with the pressure roller 5.

The safety cam portion 20 includes a movable segment of the upper cam track element 67a. It will be observed that the portion 20 extends from a point approximately 10 degrees (in relation to the direction of rotation of turret 3) beyond the point of tangency between members 3 and 22 and may include a part of the horizontal portion 67c of cam track 67, as well as a portion of the inclined segment 67d of cam track 67, the member 20 extending to a point immediately adjacent the roller 5. The member 20 is free for vertical movement against the action of suitable springs (not shown) encased in housing 21. Suitable pins 20a extend into receivers such as the flanges 20b and cam housing 4 to prevent sideways separation of members 20 and 4.

The use and operation of the invention are as follows:

All that is necessary to begin the operation and to apply the method of the invention is to actuate power means 17 which may, for example, take the form of an electric motor. Member 17 produces, through the gear train described, simultaneous and matched rotation of turret 3, nail-delivery means 15 and washer-delivery means 16.

As above, it will be convenient to describe the action of one assembly, it being understood that each assembly, of which there is a plurality, will function in the same manner.

As the turret 3 rotates in clockwise direction, as the parts are shown in FIGURE 8 for example, pulleys 88 and 101c are effective to rotate turnstile 101 and to deliver washers 100, one at a time, to and immediately above the periphery of turret flange 46. The design and rotational speed of turnstile 101 is effective to deliver a washer 100 ahead of each of the nests 116 as they sequentially approach the washer-delivery station or turnstile 101. Washer-positioning finger 108, however, which may take the form of a leaf spring, overlies the nests 116 beyond the washer delivery point and is effective to urge each washer into nesting engagement with its following nest 116. As may be best seen in FIGURE 8, the washer and nail-receiving assemblies 53 were urged radially outwardly into washer and nail-receiving position by the cam track 61 as each assembly 53 approached the washer and nail-receiving stations, the nests 116 being thus positioned in embracing relationship with dies 47. It will be understood that the washers are presented through track 28 to turnstile 101 by the action of gravity, the track 28 being suitably inclined, for example as shown in FIGURE 1, the end portion of track 28 being arranged horizontally, as best seen in FIGURE 6, for proper delivery of washer 100 to turnstile 101.

With a washer 100 thus positioned in nest 116 and resting upon the curved, circumferential upper surface of die portion 47a, continued rotation of turret 3 brings the assembly 53 into tangential alignment with the member 22 and the parts are so dimensioned and controlled as to cause an outer end portion of the track 23 to be presented at such point of tangency simultaneously with the arrival of the assembly 53. As may be best seen in FIGURES 8 and 9, the nail 130 is urged outwardly from its engagement with its associated track 23 by the chamfered end portion of finger 27, the nail shank 130b immediately engaging in the socket 124 of nail-receiving magnet member 120. Since the member 120 is positioned immediately above the segment 115 and socket 124 is positioned immediately above and in alignment with the bore 47b and die 47, it will be observed that the nail 130 is aligned with the bore 47b and with the central aperture 100a in the washer 100.

As the turret 3 continues to rotate, the head 52a of pressure rod 52 is carried along in cam track 67. As the head 52a moves from horizontal cam track portion 67c toward and into the inclined portion 67d, the pressure rod 52 is urged downwardly or toward flange 46 to engage the die surface or well 52b with the head 130b of nail 130 and to urge the nail 130 downwardly through the aperture 100a in washer 100 and into the bore 47b of die 47. No resistance is presented to the downward movement of the pressure rod 52, the head 52a merely riding upon lower track element 67b and descending by its own gravity.

When the nail was moved toward die 47 by rod 52, the magnet 120 was free to pivot and to offer only slight resistance to the movement of the nail and rod 52. The rod 52 may move beyond magnet 120 when necessary to insure insertion, for example, of shorter nails in dies 47. When the nail entered die 47, the assembly 53, being no longer needed in its outer position, was withdrawn by the action of cam track 61 and the continued rotation of turret 3.

Should there be a bent nail or other failure of the nail shank 130a to interpenetrate with the washer 100 and bore 47b, there will be a resistance to the downward movement of pressure rod 52. Such resistance will be produce a corresponding, relatively upward movement of safety cam portion 20 which in turn will actuate limit or shutoff switch 36 to deactivate power means 17 and to bring the machine to an immediate stop. The offending nail may then be simply removed, a separable portion (not shown) of skirt 68 being easily removable from safety cam portion 20 and the location of the difficulty being isolated.

Figure 13:
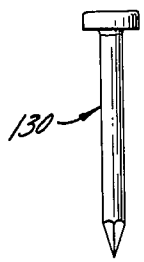
FIGURE 13 is a view of the end product of the invention.

When the rod 52 reaches the lowermost point, i.e. the point of the break in cam track 67 illustrated in FIGURE 10, the end surface of rod 52 containing well 52b will be just about to or will have just begun to encompass the washer 100. At this point the head 52a is contacted by the surface 39 of roller 5. The head 52a then moves under roller 5 and is smoothly and progressively pressed thereby to bring the opposite end surface of pressure rod 52 into engagement with the shoulder 47c of die 47, as best seen for example in FIGURE 3. In so doing the upstanding circumferential die surface 47a will have been fully received within the forming well 52b of rod 52 and the washer 100 will have been formed and permanently secured to the head 130b and the adjacent upper portion of the shank 130a of nail 130 to form the product illustrated in FIGURE 13.

As turret 3 continues to rotate, the head 52a again engages the inclined cam track portion 67d and the rod 52 is accordingly carried upwardly, as the parts are shown in the drawings, the lead-headed nail product being carried upwardly with the rod 52 by frictional engagement with the forming die pocket 52b. As the head 52a again enters the horizontal track portion 67c, only the inner edge of the head 52a is engaged by the track 67, as indicated for example in the left-hand portion of FIGURE 3. Thus the opening 52g in the head 52a is available and presented to the product-ejector wheel 30 which is positioned adjacent a part of the horizontal cam track segment 67c. As the heads 52a move beneath the wheel 30 they engage in interpenetrating relationship with the fingers 31 on wheel 30, as may be clearly seen in FIGURE 12. The fingers 31 are of sufficient extension to penetrate the apertures 52g and to engage and urge the knockout pins 52c, 52f downwardly to disengage the product from the die pocket 52b. The finished product may be received in any suitable container or conveyor (not shown) after ejection from the machine of the invention as indicated in FIGURE 12.

The amount of pressure imparted to the pressure rods 52 by the roller 5 may be adjusted as desired by merely increasing or decreasing the tension of springs 11 through rotation of elements 8a, for example, on shaft 8.

The method of the invention avoids all hammering or rapid impact while nonetheless achieving the desired rapid rate of production.

The nails 130 are delivered by gravity through the track 25. It will be understood that nails thus hanging by their heads on the upper parallel surfaces forming the track 25 will tend to cause their heads to overlap and to produce a resulting angular disposition of the nail shanks. The roller 26, however, is effective to press one, and only one, nail into each track 23 as the nail, track and roller reach the point just ahead of the engagement of roller 26 with the inner surface of hollow core 24, as may be clearly seen in FIGURE 8. Since the turntable 22 is rotating in a counterclockwise direction, as the parts are shown in FIGURE 8, and since the upper surface of member 22 is conical it will be understood that each nail moves downwardly and outwardly, through a combination of gravity and centrifugal force so that each nail reaches the outer limit of its associated track 23 well prior to its point of ejection therefrom, as again may be clearly seen in FIGURE 8. Each nail is then carried along the upper level surfaces 98a of circumferential wall 98 and 22a of member 22 until it reaches a terminus of wall 98 whereupon the nail shank is engaged by the chamfered end surface of finger 27 and is urged outwardly from the member 22. Should it occur that two nails are carried adjacent the outer end of a single track 23, the finger member 27 will be effective to engage the outermost of such nail and to retain the second, and then unwanted, nail within the track 23.

At precisely the point at which a nail is urged outwardly by finger 27 the magnet 120 and the socket 124 are presented to the nail. The nail is required to move only a very short distance so as to fully escape the track 23 which, at this point, is beginning to move away from the nail as the members 22 and 3 rotate and to be engaged in socket 124. The nail is then held by the member 120 until the pressure rod 52 is permitted to descend, to engage the nail and to urge it downwardly through the washer 100 and die member 47.

After the nail has partially penetrated the washer 100 and the die 47 the member 53 is no longer required and the cam track 61 is effective to retract the assembly 53, the nail, being engaged with rod 52 and die 47, is held against any pull of the magnet 120. The rod 52 descends, by its own gravity, in a gradual, gentle descent controlled by the lower track element 67b of cam track 67.

When the point is reached at which the product is to be formed and the lead washer is to be permanently secured to the nail, the pressure rod 52, washer 100 and nail 130 are subjected to a gentle, progressive pressure created by roller 5. Thereafter the pressure rod is withdrawn, carrying the finished product with it, and the product is ejected from the rod to a suitable conveyor or container.

While the steps involved in delivering washers and nails to the turret 3, in mating the washers and the nails and in thereafter securing the same together involve substantial description, it will be understood that each of these steps requires a very minimum amount of time and that a plurality of elements identical with those described are provided whereby the said steps occur in overlapping relationship with respect to the number of nails and washers, i.e., while roller 5 is forming the product, a nail is being delivered to an assembly 53 and a washer is being delivered to a nest 116. As shown, for example, the turret 3 carries forty-eight dies 47, forty-eight assemblies 53 and forty-eight pressure rods 52. The nail-delivering assembly 15 contains twenty-four tracks 23, the speed of rotation of turret 3 being twice that of turntable 22.

Thus the method of invention involves the smooth, progressive application of pressure alone in forming the product. The use of powered reciprocating action and the employment of high impact for hammering action is avoided. The action employed is essentially that of rotation. Power means 17, turntable 22, turnstile 101, turret 3, pressure roller 5, nail-feeding roller 26, and ejector wheel 30 all rotate. Assemblies 53 and rods 52 are given a smooth, easy reciprocation in response to the rotation of turret 3, assembly 53 being controlled by spring 56 and cam roller 60. Rod 52 moves in response to gravity and the urging of slide track 67.

The absence of hammering results in a quiet, vibration-free operation. The positive presentation of a single washer and nail, one at a time, to an assembly 53 in timed relationship with a rapidly rotating turret 3 is effective to achieve a high rate of production in the neighborhood, for example, of one-thousand completed products per minute.

Since the structure of the invention is not subjected to hammering impact and vibration, the parts thereof are capable of long wear and effective to produce the desired end product on a continuous basis with minimum maintenance and down time.

While there has been described a series of steps and an assembly of elements effective to carry out the teachings of the invention herein, it will be understood that individual changes may be made therein without departing from the nature and scope of the invention. For example, while the application of a lead washer to a nail to form a lead-headed nail is described, the method and structure of the inventions herein may well be utilized to form similar products of a variety of materials. The disclosure herein should therefore be taken as more or less representative and diagrammatic and not as limiting the scope of the invention disclosed.

There is claimed:

1. In combination a support, a turntable rotatably mounted on said support, a fixed cam on said support, a plurality of nail-receiving elements mounted on said turntable for radial reciprocation thereon, each of said nail-receiving elements having a cam-follower portion engaging said cam, said cam urging said nail-receiving elements into nail-receiving position during a portion of and in response to the rotation of said turntable, a pressure rod associated with each of said nail-receiving elements and carried by said turntable, a fixed cam track on said support, each of said rods having a portion riding in said cam track, said cam track being formed and adapted to produce reciprocation of said pressure rods in response to rotation of said turntable, a pressure roller yieldingly urged against said pressure rods during a portion of the excursion of said pressure rods produced by rotation of said turntable.

2. A headed nail-forming assembly including a support, a nail-feeding carousel rotatable on said support, a forming turntable rotatable on said support, a head-feeding turnstile rotatable on said support, said carousel and turnstile having their peripheries immediately adjacent the periphery of said turntable, said turntable having a plurality of nests positioned to receive head elements from said turnstile, said turntable having a plurality of nail-holding elements positioned to receive nails from said carousel, a plurality of pressure elements carried by said turntable for engaging nails and head elements delivered by said carousel and turnstile in response to rotation of said turntable, and a pressure roller yieldingly urged against said pressure elements during a portion of their excursion in response to rotation of said turntable, to press said pressure elements against said nail and head elements to form a headed nail.

3. A headed nail-forming assembly including a support, a nail-feeding carousel rotatable on said support, a forming turntable rotatable on said support, a head-feeding turnstile rotatable on said support, said carousel and turnstile having their peripheries immediately adjacent the periphery of said turntable, said turntable having a plurality of nests positioned to receive head elements from said turnstile, said turntable having a plurality of nail-holding elements positioned to receive nails from said carousel, a plurality of pressure elements carried by said turntable for engaging nails and head elements delivered by said carousel and turnstile in response to rotation of said turntable, and a pressure roller yieldingly urged against said pressure elements during a portion of their excursion in response to rotation of said turntable, to press said pressure elements against said nail and head elements to form a headed nail, said pressure elements having pockets formed and adapted to receive and retain the head and head element of the formed headed nail, and means for discharging said headed nail from said pressure elements including a knockout rod carried by each of said pressure elements and a finger element rotatably mounted on said support for engagement with said knockout rods to urge the same against the headed nail.

4. For use in a nail-forming machine, a turntable, a plurality of dies arranged along the periphery of said turntable, a plurality of nail-receiving elements mounted for radial reciprocation on said turntable toward and away from a position adjacent said dies, each of said nail-receiving elements including a block having an outwardly open groove, said block having a magnetic property effective to attract and hold a nail in a predetermined position with respect to said die, said block being pivotally mounted on said element and yieldingly urged toward nail-receiving position.

5. For use in a nail-forming machine, a turntable, a plurality of die elements circumferentially spaced on and adjacent the periphery of said turntable, a holding assembly for each of said die elements, each said holding assembly being mounted for radial reciprocation toward and away from said die elements on said turntable in response to rotation of said turntable, each of said holding assemblies including a washer nest positionable adjacent said die elements to locate a washer on its associated die element, each of said holding assemblies including a nail-receiving element, said nail-receiving element being movable into position overlying its associated die element to receive and hold a nail above and in axial alignment with said die element, and a washer held thereon by said washer nest.

6. For use in a nail-forming machine, a turntable, a plurality of die elements circumferentially spaced on and adjacent the periphery of said turntable, a holding assembly for each of said die elements, each said holding assembly being mounted for radial reciprocation toward and away from said die elements on said turntable in response to rotation of said turntable, each of said holding assemblies including a washer nest positionable adjacent said die elements to locate a washer on its associated die element, each of said holding assemblies including a nail-receiving element, said nail-receiving element being movable into position overlying its associated die element to receive and hold a nail above and in axial alignment with said die element, and a washer held thereon by said washer nest, a pressure rod for each of said die elements, each said pressure rod being mounted for reciprocation toward and away from its associated die element in response to rotation of said turntable.

7. For use in a nail-forming machine, a turntable, a plurality of die elements circumferentially spaced on and adjacent the periphery of said turntable, a holding assembly for each of said die elements, each said holding assembly being mounted for radial reciprocation toward and away from said die elements on said turntable in response to rotation of said turntable, each of said holding assemblies including a washer nest positionable adjacent said die elements to locate a washer on its associated die element, each of said holding assemblies including a nail-receiving element, said nail-receiving element being movable into position overlying its associated die element to receive and hold a nail above and in axial alignment with said die element, and a washer held thereon by said washer nest, a pressure rod for each of said die elements, each said pressure rod being mounted for reciprocation toward and away from its associated die element in response to rotation of said turntable, a first cam track, each of said holding assemblies having a portion engaging said first cam track to product reciprocation of said holding assembly in response to rotation of said turntable, a second cam track, each of said pressure rods having a portion engaging said second cam track to produce reciprocation of said pressure rods toward and away from said die elements in response to rotation of said turntable.

8. For use in a nail-forming machine, a turntable, a plurality of die elements circumferentially spaced on and adjacent the periphery of said turntable, a holding assembly for each of said die elements, each said holding assembly being mounted for radial reciprocation toward and away from said die elements on said turntable in response to rotation of said turntable, each of said holding assemblies including a washer nest positionable adjacent said die elements to locate a washer on its associated die element, each of said holding assemblies including a nail-receiving element, said nail-receiving element being movable into position overlying its associated die element to receive and hold a nail above and in axial alignment with said die element, and a washer held thereon by said washer nest, a pressure rod for each of said die elements, each said pressure rod being mounted for reciprocation toward and away from its associated die element in response to rotation of said turntable, a first cam track, each of said holding assemblies having a portion engaging said first cam track to produce reciprocation of said holding assembly in response to rotation of said turntable, a second cam track, each of said pressure rods having a portion engaging said second cam track to produce reciprocation of said pressure rods toward and away from said die elements in response to rotation of said turntable, a break in said second cam track, a pressure roller having its periphery rotatable through said break to engage said pressure rods and to urge the same toward said die elements.

References Cited by the Examiner
UNITED STATES PATENTS

| | | | |
|---|---|---|---|
| 1,272,634 | 7/1918 | Escobales | 10—158 |
| 1,571,232 | 2/1926 | Brennan | 10—165 |
| 1,589,939 | 6/1926 | Case | 10—158 |
| 1,762,192 | 6/1930 | Peirce | 269—8 |
| 2,273,783 | 2/1942 | Irwin | 10—169 |
| 2,379,564 | 7/1945 | Cole | 10—165 |
| 2,577,020 | 12/1951 | Large | 10—158 |
| 2,774,084 | 12/1956 | Nielsen | 10—169 |

WILLIAM W. DYER, JR., *Primary Examiner.*

F. T. YOST, *Assistant Examiner.*